April 9, 1929.  M. C. SPENCER  1,708,908
TRANSLATING SYSTEM FOR CONVERTING ALTERNATING
CURRENT INTO DIRECT CURRENT
Filed Feb. 14, 1925  2 Sheets-Sheet 1

Inventor,
Millard Cole Spencer,
By Samuel W. Balch
Attorney.

April 9, 1929. M. C. SPENCER 1,708,908
TRANSLATING SYSTEM FOR CONVERTING ALTERNATING
CURRENT INTO DIRECT CURRENT
Filed Feb. 14, 1925     2 Sheets-Sheet 2
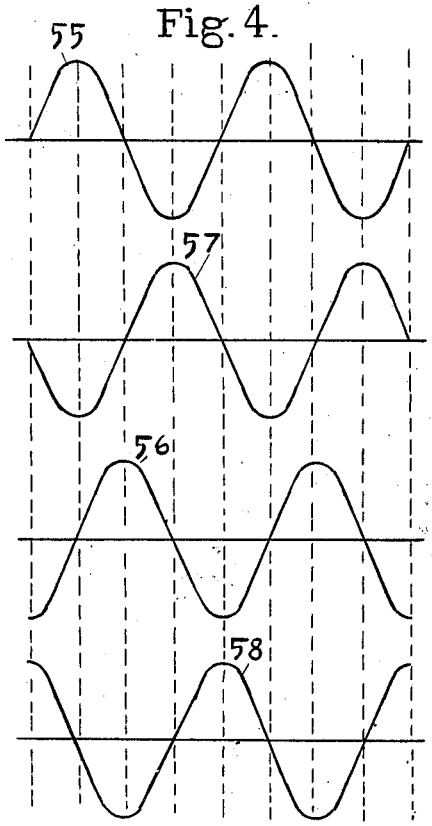
Fig. 4.
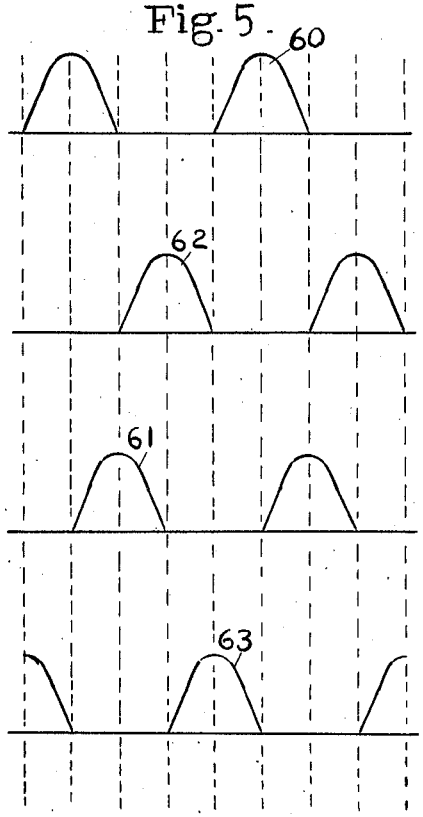
Fig. 5.
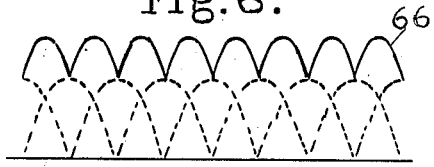
Fig. 6.
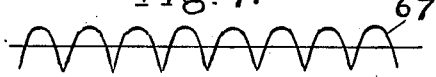
Fig. 7.
Fig. 8.
Inventor,
Millard Cole Spencer.
By Samuel W. Balch
Attorney Patented Apr. 9, 1929.

1,708,908

UNITED STATES PATENT OFFICE.

MILLARD COLE SPENCER, OF EAST ORANGE, NEW JERSEY, ASSIGNOR TO CROCKER-WHEELER ELECTRIC MANUFACTURING COMPANY, OF AMPERE, NEW JERSEY, A CORPORATION OF NEW JERSEY.

TRANSLATING SYSTEM FOR CONVERTING ALTERNATING CURRENT INTO DIRECT CURRENT.

Application filed February 14, 1925. Serial No. 9,362.

The object of this invention is to provide a translating system for economically converting power received from a commercial single-phase alternating-current source into direct current of the requisite uniformity and voltage for the heating of the filaments of thermionic tubes and for supplying other circuits required in the transmission and amplification of telephonic currents, particularly in radio receiving sets.

In accordance with this invention, single-phase alternating current is transformed into a symmetrical polyphase system, each phase is rectified, the rectified phases are combined into overlapping phases with a resultant alternating-current component and a direct current component, and these components are so separated that a substantially uniform direct current is derived.

In the accompanying two sheets of drawings which form a part of this description, Figure 1 is a diagrammatic representation of one embodiment of the invention in which the received power is converted into a four-phase system, rectified electrolytically, combined to form a direct current with an alternating-current component, and the alternating-current component diverted through a resistance by a choke coil.

Fig. 4 shows diagrammatically the four waves of the four-phase system as formed by the system shown in Figs. 1 and 3.

Fig. 5 shows diagrammatically the several waves rectified by the suppression of the negative pulses.

Fig. 6 shows in dotted line the rectified pulses of the four waves superimposed with the pulses overlapping, and in full line the resultant direct current with its alternating-current component.

Fig. 7 shows the alternating-current component.

Fig. 8 shows the direct-current component.

Figure 1:
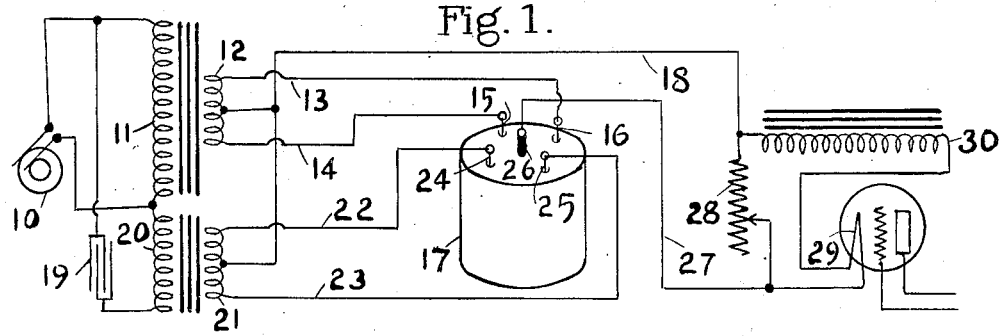

In the form shown in Fig. 1, a source of power 10, forming a single-phase system at 110 volts and sixty cycles, is received on the primary 11 of a transformer, and the voltage is stepped down to a secondary 12, a suitable ratio of turns being 1000 to 450. Through leads 13 and 14 from the ends of the secondary it is connected in two reversed circuits to cathodes 15 and 16 of an electrolytic rectifier 17, the return circuit being through a lead 18 to the middle point of the secondary. From the source of power connection is also made through a condenser 19 of sixteen microfarads capacity by which the phase is advanced and received on the primary 20 of a second transformer. The voltage is stepped down to a secondary 21, a suitable ratio of turns for this transformer being 500 to 450. Through leads 22 and 23 from the ends of this secondary it is connected in two reversed circuits to cathodes 24 and 25 of the electrolytic rectifier. The return circuit is to the middle point of the secondary through the same conductor which leads to the middle point of the secondary of the first transformer. By this arrangement the single phase of the source is converted into a star-connected four-phase system with equal current flow in the four leads and the phases symmetrically displaced with respect to each other. The negative pulses in each phase are suppressed in the rectifier, the current is converted into unidirectional pulses and the pulses are combined at the anode 26 and lead 27 into overlapping pulses, and thereby form a continuous current with a direct-current component and an alternating current component. The current in this lead returns to the middle points of the transformers through two paths in parallel one of which is through an adjustable resistance 28 and the other of which is through a thermionic-tube filament 29 and a choke coil 30. The resistance, which is adjustable, is conveniently of thirty ohms or less and the choke coil has an inductance of one henry or more to obtain a satisfactorily smooth current for heating the filaments of a radio receiving set. The core of the choke coil is formed with an air-gap to prevent saturation by the direct-current component.

Figure 2:
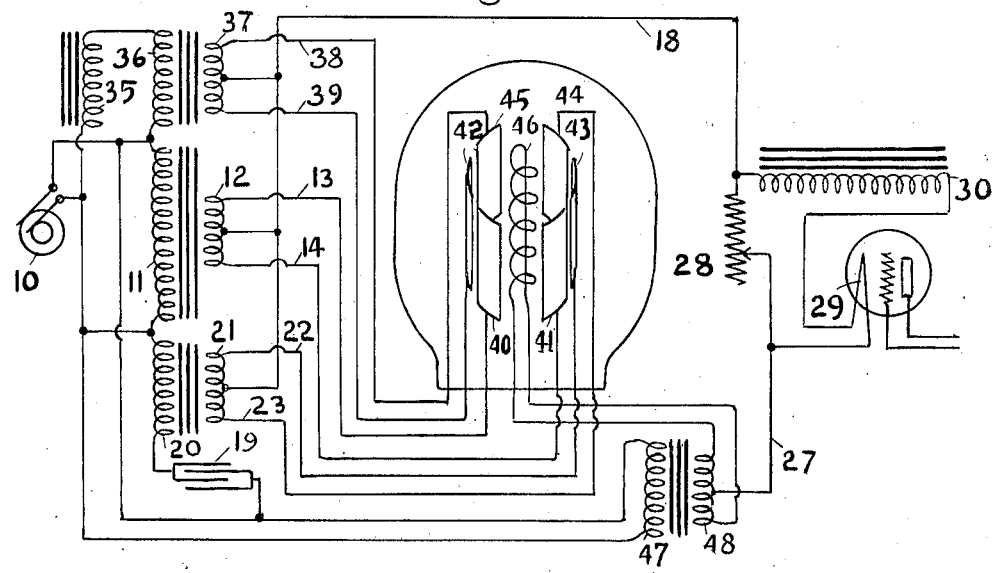
Fig. 2 is a diagrammatic representation of a modification in which the received power is converted into a six-phase system and rectified by a thermionic tube.

In the modification shown in Fig. 2 the condenser is so adjusted that the phase will be advanced by sixty degrees. From the source of power connection is also made through an inductance 35 which is so adjusted that the phase will be retarded sixty degrees and received on the primary 36 of a third transformer. The voltage is stepped down to a secondary 37, a suitable ratio of turns for this transformer being 500 to 450. Through leads 38 and 39 from the ends of this secondary two additional phases are derived and by this arrangement the single-phase system of the source is converted into a star-connected six-phase system with equal current flow in the six leads and the phases symmetrically displaced with respect to each other. In this modification a six-phase thermionic-tube rectifier is used, the six leads from the ends of the secondaries being led to six plates 40, 41, 42, 43, 44, 45 constituting the anodes of the rectifier. The filament 46 constituting the cathode of the rectifier is heated through a transformer consisting of a primary 47 connected to the source, and a secondary 48, the ends of which are connected to the filament. The rectified current is led from the middle point of the secondary.

Figure 3:
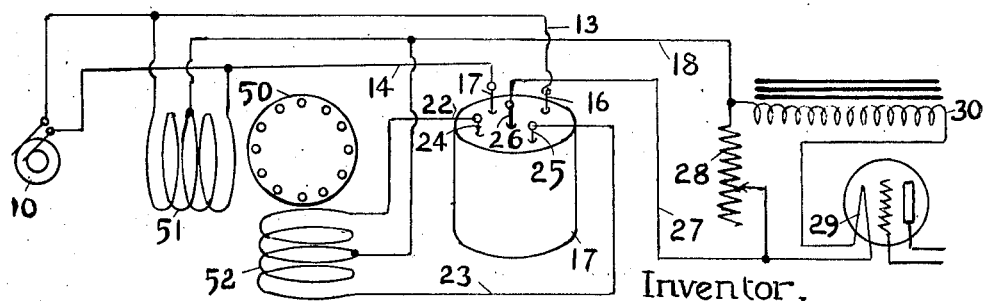
Fig. 3 is a diagrammatic representation of a modification in which the received power is converted into a four-phase system through an induction machine and rectified electrolytically.

In the modification shown in Fig. 3, an induction machine 50, which is self-driven, is used to convert the single-phase current which is supplied into a four-phase system. The machine is provided with a winding 51 which is energized from the single-phase source, and is also provided with a second winding 52 which is displaced ninety electrical degrees with respect to the first winding. The four phases are taken from the ends of the two windings and the return is to the middle points. The single-phase current is supplied at a suitable voltage for the rectifier.

The action of the system in producing smooth direct current is as follows: The current flowing in the primary winding 11 of the first transformer lags behind the electromotive force of the source by an angle determined by the action of the choke coil and the other elements in the circuit, and with the values above stated the angle was found to be thirty degrees. The current in the primary winding 20 of the second transformer would, under the action of the same elements alone, also lag behind the source by the same angle, but by means of the condenser 19 the current is advanced by an angle of sixty degrees ahead of the electromotive force of the source, and is thus made to lead the current in the first transformer by an angle of ninety degrees. The ratios between the primaries and the secondaries of the two transformers are of such values that the secondary voltages form a symmetrical two-phase system, that in the first transformer and on the lead 13 being represented in Fig. 4 by the curve 55, and that in the second transformer and on the lead 22 by the curve 56, between which dotted lines are drawn to assist in comparing the amount of the displacement. The phase of the first transformer is reversed on the lead 14 as represented by the curve 57, and the phase of the second transformer is reversed on the lead 23 as represented by the curve 58. The phases as represented by the curves 55, 56, 57, 58 progressively advance by ninety degrees and the voltages on the conductors 13, 22, 14, 23 therefore form a symmetrical star-connected four-phase system.

If an electrolytic rectifier is used the positive pulses will be suppressed. If a thermionic tube rectifier is used the negative pulses will be suppressed. In what follows it will be assumed that the negative pulses are suppressed on each of four leads.

The rectifier in series with each lead suppresses the negative portions so that the current flow in the conductor 13 will be a series of pulses as represented in Fig. 5 at 60, in conductor 22 as represented at 61, in conductor 14 as represented at 62, and in conductor 23 as represented at 63. These are displaced with respect to each other and when combined on the conductor 27 will overlap as indicated in Fig. 6 by the dotted lines. The resultant current will be as represented by the full line 66. It may be considered to consist of a direct-current component with an alternating-current component superimposed on it. The alternating-current component is represented in Fig. 7 at 67, and the direct-current component is represented in Fig. 8 at 68. It will be seen that the alternating-current component has a frequency of four times the frequency of the original single-phase impressed electromotive force of 60 cycles, the frequency of the alternating-current component being 240 cycles. This increase in the frequency is of advantage, as it increases the effectiveness of the choke coil which is used to prevent this alternating-current component from reaching the instrumentality which requires the smooth direct current, since the impedance of the choke coil for an alternating current is directly proportional to the frequency of the current.

The adjustable resistance, which affords a shunt around the choke coil and instrumentality which is to be supplied with direct current, serves two purposes. In the first place, it provides a path around the filament for the alternating-current component. In the second place, it provides a means for adjusting the total amount of the current drawn from the rectifier to a fixed value, for the amount of current in the receiving circuit may be increased or diminished by increasing or diminishing the resistance. It is desirable to keep the current drawn from the rectifier constant in order to maintain the balance in the polyphase system.

I claim:

A translating system for obtaining from a single-phase alternating-current source a smooth direct current for lighting the filaments of the vacuum tubes of a radio receiver consisting of a plurality of transformers with their primary windings connected to the single-phase source, means located in the primary circuit of one of the transformers for displacing the phase of the current and producing a symmetrical polyphase system, means for rectifying the secondary currents of the transformers into unidirectional pulses and combining the pulses into overlapping pulses, an adjustable resistance connected across the output terminals of the rectifier forming a return path for the pulsating component of the rectifier current output and forming a means of adjusting the rectifier current to a fixed value with changes in the load current, and a choke coil in series with the load circuit to prevent pulsations in the current from reaching the load circuit.

MILLARD COLE SPENCER.